F. H. BOGDA.
ANIMAL STALL.
APPLICATION FILED JUNE 18, 1915.
1,201,246.
Patented Oct. 17, 1916.
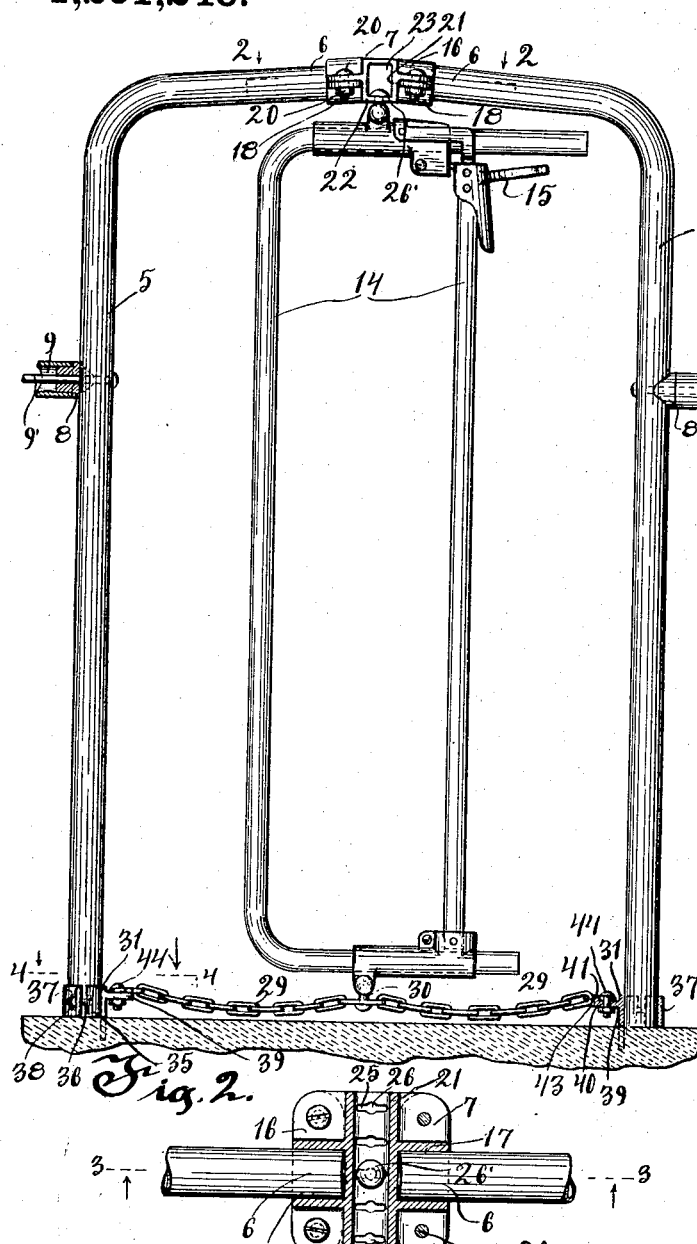
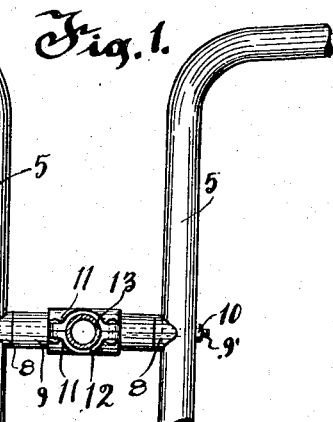
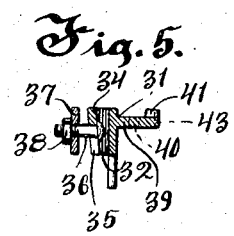
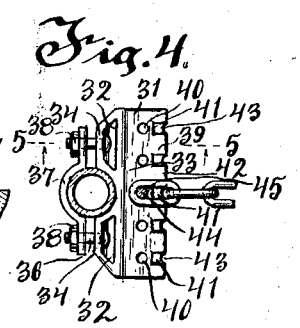
INVENTOR
Frank H. Bogda
Upsell, Kenney & French.
ATTORNEYS.

UNITED STATES PATENT OFFICE.

FRANK H. BOGDA, OF BURNETT, WISCONSIN.

ANIMAL-STALL.

1,201,246.  Specification of Letters Patent.  Patented Oct. 17, 1916.

Application filed June 18, 1915. Serial No. 34,786.

*To all whom it may concern:*

Be it known that I, FRANK H. BOGDA, a citizen of the United States, and resident of Burnett, in the county of Dodge and State of Wisconsin, have invented new and useful Improvements in Animal-Stalls, of which the following is a description, reference being had to the accompanying drawings, which are a part of this specification.

The invention relates to animal stalls.

The invention designs more particularly to provide a stall-frame for cattle in which the upper end of the stanchion is connected to a two piece arch through a coupling forming an adjustable alinement device and in which the lower end of the stanchion is controlled in its movements by the connections secured to it and adjustably secured to the stanchion arch.

The invention further designs to provide a new and improved form of animal stall.

The invention consists in the several features hereinafter set forth and more particularly defined by claims at the conclusion hereof.

In the drawings, Figure 1 is a view of the device embodying the invention; Fig. 2 is a section taken on line 2—2 of Fig. 1; Fig. 3 is a section taken on line 3—3 of Fig. 2; Fig. 4 is a section taken on line 4—4 of Fig. 1; Fig. 5 is a section taken on line 5—5 of Fig. 4.

At the present time manufacturers of barn equipments are all striving to produce devices tending to increase the sanitary conditions of the barn and it is the present practice in cattle barns to make the stall-floors of concrete with a gutter at the rear of the stalls. To make this gutter available for sanitary purposes, it is necessary to provide some means for positioning the animal in the stall so that its rear will come substantially at the edge of the gutter and to do this the means for positioning the animal must be made adjustable to accommodate for animals of different length.

It is one of the objects of the present invention to accomplish this purpose by providing a means for adjustably connecting the upper and lower parts of the stanchion to the stall frame.

Referring to the drawings, 5 indicates the members which, connected together at the upper ends 6 by a coupling member 7, form a two piece arch mounted on the floor of the stall. Adjacent arches are connected together by apertured arch embracing sections 8; a hollow section 9 and a bolt 9', running through said members 5, sections 8 and 9 and secured in place by a nut 10 so that the arches are connected together. A pair of coupling members 11 surround the section 9 and are provided with openings 12 for receiving the ends of the stall-sides 13. This construction forms a simple substantial stall frame-work for supporting a stanchion 14, which may be of any kind, but preferably of the type wherein a forked member 15 engages with the standard or arch member adjacent thereto when the stanchion is open to thereby prevent the animal from entering its head between the standard and the stanchion when driven into the stall. Connected to the arched stanchion supports are means for adjustably mounting the upper and lower ends of the standard in position for the purposes heretofore pointed out.

The means for adjustably mounting the upper end of the stanchion to the stall-frame comprises the coupling member 7, before mentioned. This coupling member consists of a member 16 having semi-circular recesses 17 on either side thereof for receiving the upper portion of the ends 6 of the supports 5 and clip plates 18 having arched support engaging portions 19 are secured to the lower portions of the ends 6 of the supports 5 by bolts 20 passing through said member 16 and the said plates. Thus the member 16 together with the clip plates 18 serve to couple the ends of the arched supports 5 together. The member 16 is provided with depending flanges 21 connected across at their lower end by a web 22 whereby a rectangular channel 23, extending at right angles to the supports 5 is formed in the intermediate portion of the member 16. The web or bottom 22 of this channel is provided with a plurality of slots 25 extending across the channel and provided with enlargements 26 intermediate their ends forming a circular opening. A bolt, having a head 28', vertically extending portion 27 and an eyed end 28, is adapted to be positioned in any one of the slots 25 as the length and width of said slots are sufficient to accommodate the insertion of the eyed end of the bolt. A bolt is adapted to pass through the upper end of the stanchion and the eye in the bolt whereby the stanchion will be rotatably mounted upon the coupling member 7.

The means for securing the lower end of the stanchion in adjusted position comprises flexible connections, such as chains 29, secured at their inner ends to an eyed bolt 30 secured to the lower end of the stanchion and means for adjustably mounting the outer ends of the chains on the stall-frame. This means comprises, in each instance, a member 31 having apertured portions 32 disposed on either side of a curved support engaging portion 33, the outer sides 34 of said portions 32 having vertical slots 35 therein for receiving bolts 36 which pass therethrough and secure said member to the standard by the clip plate 37 and nuts 38, and the inner sides extending downwardly into the concrete floor to firmly anchor the device. Each member 36 is provided with an inwardly extending flange 39. This flange is provided with a plurality of apertures 40 and in alinement with each of these apertures are projections 41 extending to the edge 42 of the flange and provided with curved recesses 43 at the edge of the flange. A bolt 44 is adapted to be inserted in place in any one of these apertures and within the opening 45 in the last link of the chain 29 which bolt is held in place by the usual nut and the projections 41 fit within the opening 45 in the chain link and the next link is held in place by the curved recess 43, as shown in Fig. 3. Thus the ends of the chains are firmly held in place by the adjustable connection above described. Thus the stanchion, by means of the bolts 27 and 30 is swiveled between the upper coupling member 7 and the chains 29.

In practice the eyed bolt for the upper portion of the stanchion is placed in position in one of the slots 25 in the member 16 so as to bring the rear of the animal in line with the gutter when the stanchion is in place. The stanchion 14 is then connected up to this bolt and the chains 29 at the lower end of the stanchion are connected up to the members 31 by inserting the bolts 44 through the links positioned on the adjacent projections 41 and into the proper apertures 40 in the flange 39 so that the stanchion will be vertically disposed with respect to the stall-floor.

The invention thus exemplifies a stall-frame of simple and substantial construction which is provided with means for adjusting the upper and lower ends of the stanchion with respect thereto so as to properly position animals of different length in the stalls for the purpose heretofore specified.

The invention is not to be restricted to the details of construction herein set forth, but may be varied so as to be within the scope of the appended claims which are intended to cover the novelty inherent in the construction as broadly as is permitted by the state of the art.

What I claim as my invention is:—

1. The combination, with a stanchion supporting frame, of an alinement device for adjustably securing the upper end of the stanchion to the frame comprising a member having a channel therein and a plurality of apertures having medial enlargements in the bottom of said channel, and removable stanchion-fastening means consisting of a headed eye bolt adapted to be placed in any one of said apertures to aline the stanchion.

2. An alinement device and coupling comprising a pair of registering members, each member having frame end-receiving recesses and a transverse channel therein, the bottom of the channel of the lower member being provided with a plurality of apertures, removable stanchion-fastening means adapted to be placed in any one of said apertures, and means for securing said members together.

3. In combination, a stall frame including a pair of fixed stanchion-supporting members, and a device for coupling together the upper ends of said members to form a rigid frame and for adjustably supporting the stanchion therefrom.

4. In combination, a stall frame including a pair of fixed stanchion supporting members, a device for joining together the upper ends of said members to form a rigid frame and for adjustably supporting the stanchion therefrom, and independent means secured to the lower end of the stanchion and adjustably secured to said members for securing the lower end of the stanchion in position.

5. In combination, a stall-frame including a pair of stanchion-supporting members, and a stanchion alinement device for joining said members together to form an arch, said device comprising a member having a channel therein and a plurality of apertures in the bottom of said channel, and removable stanchion fastening means adapted to be placed in any one of said apertures to aline the stanchion.

6. In combination, a stall-frame including a pair of stanchion supporting members, and a stanchion alinement device for joining said members together to form an arch, said device comprising a member having a channel therein and a plurality of apertures having medial enlargements in the bottom of said channel, and removable stanchion fastening means consisting of a headed eyed bolt adapted to be placed in any one of said apertures to aline the stanchion.

7. In combination, a stall-frame including stanchion supporting members, a stanchion alinement device secured to said members for adjustably supporting said stanchion, an alinement device for the lower end of the stanchion comprising chains secured to the stanchion, alinement members secured to said supporting members, said alinement members having a plurality of apertures therein, projections disposed adjacent said apertures adapted to be disposed within the chain links, and fastening means passing through said apertures to secure the chains in adjusted position.

8. The combination, with a stanchion-supporting frame, of means for adjustably securing the lower end of the stanchion thereto comprising chains secured to the stanchion, alinement members having a plurality of apertures therein, projections on said members disposed adjacent said apertures and curved link receiving recesses adjacent said projections, and fastening means passing through said apertures to secure the chains in adjusted position, the last chain links being adapted to receive the fastening means and the projections and the curved recesses being adapted to receive the adjacent links.

9. A stall frame including a pair of stanchion-supporting frame members anchored in the floor of the stall, and a coupling comprising a pair of clamping members for securing the upper ends of the frame members together to form an arch, and means on one of said clamping members for adjustably supporting the stanchion therefrom.

10. A stall frame including a pair of stanchion-supporting frame members anchored in the floor of the stall, and a coupling comprising a pair of clamping members for securing the upper ends of the frame members together to form an arched frame, and means on one of said clamping members for supporting the stanchion therefrom.

In testimony whereof, I affix my signature, in presence of two witnesses.

FRANK H. BOGDA.

Witnesses:
A. L. FALKINHAM,
BARNEY A. BELLING.

Copies of this patent may be obtained for five cents each, by addressing the "Commissioner of Patents, Washington, D. C."